United States Patent
Kim et al.

(10) Patent No.: US 9,756,305 B2
(45) Date of Patent: Sep. 5, 2017

(54) METHOD AND APPARATUS FOR RECEIVING VIDEO

(71) Applicant: NEXTCHIP CO., LTD., Seongnam-si (KR)

(72) Inventors: Do Kyun Kim, Seoul (KR); Jin Gun Song, Seoul (KR)

(73) Assignee: NEXTCHIP CO., LTD., Seongnam-si (KR)

(*) Notice: Subject to any disclaimer, the term of this patent is extended or adjusted under 35 U.S.C. 154(b) by 0 days.

(21) Appl. No.: 15/031,916

(22) PCT Filed: Feb. 27, 2015

(86) PCT No.: PCT/KR2015/001911
§ 371 (c)(1),
(2) Date: Apr. 25, 2016

(87) PCT Pub. No.: WO2016/098946
PCT Pub. Date: Jun. 23, 2016

(65) Prior Publication Data
US 2016/0337627 A1    Nov. 17, 2016

(30) Foreign Application Priority Data

Dec. 16, 2014 (KR) .................. 10-2014-0181472

(51) Int. Cl.
H04N 7/01     (2006.01)
H04N 11/20    (2006.01)
(Continued)

(52) U.S. Cl.
CPC ............. *H04N 9/64* (2013.01); *H04N 5/44* (2013.01); *H04N 7/0102* (2013.01);
(Continued)

(58) Field of Classification Search
USPC ....... 348/457, 441, 443, 445, 469, 470, 471, 348/473, 474, 478, 479, 489, 493, 547,
(Continued)

(56) References Cited

U.S. PATENT DOCUMENTS 4,122,477 A * 10/1978 Gallo ................... G11B 17/005
                                                        348/476
4,731,654 A *  3/1988 Itabashi ................. H04N 17/04
                                                        348/725
(Continued)

FOREIGN PATENT DOCUMENTS

CN    1218351 A    6/1999
CN    1764247 A    4/2006
(Continued)

OTHER PUBLICATIONS

Korean Final Office Action, Application No. 10-2014-0181472, dated Sep. 25, 2015, 4 pages.
(Continued)

*Primary Examiner* — Jefferey F Harold
*Assistant Examiner* — Mustafizur Rahman
(74) *Attorney, Agent, or Firm* — Daly, Crowley, Mofford & Durkee, LLP

(57) ABSTRACT

Provided is a method and apparatus for converting, to a digital video signal, an analog video signal capable of having a variety of resolutions. A video reception apparatus determines a format of an analog video signal by sampling the analog video signal. The video reception apparatus converts the analog video signal to a digital video signal based on the determined format. A comb filter is used to separate a color difference signal and a luminance signal from the digital video signal, and the digital video signal is reconfigured using the luminance signal and the color difference signal.

17 Claims, 8 Drawing Sheets

(51) Int. Cl.
  *H04N 9/64* (2006.01)
  *H04N 9/78* (2006.01)
  *H04N 7/18* (2006.01)
  *H04N 11/24* (2006.01)
  *H04N 21/426* (2011.01)
  *H04N 21/41* (2011.01)
  *H04N 5/44* (2011.01)

(52) U.S. Cl.
  CPC ............ *H04N 7/183* (2013.01); *H04N 9/642* (2013.01); *H04N 9/78* (2013.01); *H04N 11/006* (2013.01); *H04N 21/4122* (2013.01); *H04N 21/42607* (2013.01)

(58) Field of Classification Search
  USPC ....... 348/572, 573, 651, 661, 665, 667, 712, 348/719, 370, 396.1, 398.1, 392.1, 399.1, 348/234, 235, 258, 269, 68, 70; 345/690, 345/589, 591, 593, 604
  See application file for complete search history.

(56) References Cited

U.S. PATENT DOCUMENTS

| | | | | | |
|---|---|---|---|---|---|
| 4,984,083 | A | * | 1/1991 | Okamoto | H04N 5/45 348/565 |
| 5,251,041 | A | * | 10/1993 | Young | H04N 5/913 360/5 |
| 5,525,984 | A | * | 6/1996 | Bunker | H03M 1/0641 341/131 |
| 5,717,469 | A | * | 2/1998 | Jennes | H04N 1/00283 348/525 |
| 5,737,032 | A | * | 4/1998 | Stenzel | H04N 9/68 348/649 |
| 5,748,260 | A | * | 5/1998 | Hatano | H04N 9/78 348/663 |
| 5,815,220 | A | * | 9/1998 | Marshall | H04N 9/66 348/663 |
| 6,034,735 | A | * | 3/2000 | Senbongi | H04N 9/45 348/505 |
| 6,184,939 | B1 | * | 2/2001 | Wang | H04N 5/14 348/537 |
| 6,226,039 | B1 | * | 5/2001 | Yoon | H04N 5/45 348/445 |
| 6,529,244 | B1 | * | 3/2003 | Hrusecky | H04N 21/8146 348/441 |
| 6,570,990 | B1 | * | 5/2003 | Kohn | H04N 7/1675 348/E11.002 |
| 2003/0218695 | A1 | * | 11/2003 | Kim | H04N 9/69 348/675 |
| 2004/0036703 | A1 | * | 2/2004 | Aoki | G09G 5/10 345/690 |
| 2006/0077302 | A1 | * | 4/2006 | Nieuwenhuizen | H04N 9/78 348/665 |
| 2006/0078054 | A1 | | 4/2006 | Gudmundson et al. | |
| 2008/0056357 | A1 | * | 3/2008 | Chan | H04N 5/14 375/240.12 |
| 2008/0124050 | A1 | * | 5/2008 | Deschamp | G11B 27/034 386/241 |
| 2008/0225174 | A1 | | 9/2008 | Greggain et al. | |
| 2009/0128691 | A1 | * | 5/2009 | Nishigaki | G09G 5/391 348/441 |
| 2010/0146631 | A1 | * | 6/2010 | Folea | H04L 63/0428 726/26 |
| 2012/0188448 | A1 | * | 7/2012 | Kimura | H04N 7/0117 348/521 |
| 2012/0320264 | A1 | * | 12/2012 | Mombers | H04N 5/53 348/441 |
| 2013/0194498 | A1 | * | 8/2013 | Funada | H04N 9/642 348/547 |
| 2015/0201151 | A1 | * | 7/2015 | Komiyama | H04N 5/46 348/556 |

FOREIGN PATENT DOCUMENTS

| | | |
|---|---|---|
| CN | 1969543 A | 5/2007 |
| CN | 101137032 A | 3/2008 |
| CN | 101951489 A | 1/2011 |
| EP | 2 043 355 A1 | 4/2009 |
| GB | 2 171 573 A | 8/1986 |
| JP | H07298295 A | 11/1995 |
| JP | 2002135621 A | 5/2002 |
| KR | 10-1998-0060351 | 10/1998 |
| KR | 20000007611 A | 2/2000 |
| KR | 100435196 B1 | 8/2004 |
| KR | 20060063723 A | 6/2006 |
| KR | 101440260 B1 | 9/2014 |

OTHER PUBLICATIONS

Korean Notice of Allowance, Application No. 10-2014-0181472, dated Nov. 25, 2015, 2 pages.
Korean Office Action, Application No. 10-2014-0181472, dated Jun. 4, 2015, 4 pages.
PCT International Search Report, PCT/KR2015/001911, dated Feb. 27, 2015, 3 pages.
PCT Written Opinion, PCT/KR2015/001911, dated Sep. 3, 2015, 4 pages.
Chinese Office Action, Application No. 201510359275.9, Mar. 11, 2016, 6 pages.
Moore MO, CVI, TVI, AHD, Three Kingdom's fight, Sep. 12, 2014, 5 paqes, linkedin.com.

* cited by examiner

METHOD AND APPARATUS FOR RECEIVING VIDEO

CROSS REFERENCE TO RELATED APPLICATION

This application is a U.S. National Stage of PCT application PCT/KR2015/001911 filed in the Korean language on Feb. 27, 2015, and entitled "METHOD AND APPARATUS FOR RECEIVING VIDEO," which claims priority to Korean application KR 10-2014-0181472, filed Dec. 16, 2014 which applications are each hereby incorporated herein by reference in their entireties.

TECHNICAL FIELD

Example embodiments relate to video reception technology, and more particularly, to a method and apparatus for receiving an analog video signal.

RELATED ART

A video transmission method may include a method of using an open circuit and a method of using a closed circuit. Since a video transmission method using an open circuit is to transmit video signals to a plurality of unspecific users, a standardized scheme may be employed to transmit a video. On the other hand, since a video transmission method using a closed circuit is to transmit a video signal only to a specific use only the specific user may be aware of a video signal transmission scheme.

In general, a composite signal used in a closed-circuit system follows a standard method about an analog color television (TV). Since the standard method uses a limited frequency band, an alternating color issue and a luminance inclusion issue may occur.

Korean Patent Publication No. 10-2006-0063723, published on Dec. 5, 2005, discloses the invention relating to a video signal processing device and a video signal transmission method. This invention may be applied to display a national television system committee (NTSC)-based video signal, thereby effectively avoiding displaying of an unnatural edge and efficiently processing a video signal having a relatively high frame frequency through a simple configuration. In the published invention, a center value of a temporal axis in a single frame of a color difference signal is set to be closest to a center value of a temporal axis in a plurality of flames of a luminance signal corresponding to the color difference signal, and the single frame of the color difference signal is allocated to the plurality of frames of the luminance signal.

DETAILED DESCRIPTION

Technical Subject

Example embodiments provide an apparatus and method for receiving a video.

Example embodiments also provide an apparatus and method for converting a received analog video signal to a digital video signal.

Solution

According to an aspect, there is provided a video reception method including receiving an analog video signal, determining a format of the analog video signal, converting the analog video signal to a digital video signal based on a sampling frequency corresponding to the determined format, separating the digital video signal into a luminance signal and a color difference signal using an adaptive comb filter, and reconfiguring the digital video signal based on the luminance signal and the color difference signal.

The comb filter may be adaptively adjusted based on a burst frequency corresponding to the determined format.

The video reception method may further include removing noise from at least one of the luminance signal and the color difference signal.

The removing of the noise may include removing the noise using a low pass filter.

The determining of the format may include sampling the analog video signal at a preset sampling frequency, determining the format of the analog video signal based on a result of the sampling, and resetting the sampling frequency corresponding to the determined format as a basic sampling frequency.

The determining of the format of the analog video signal based on the result of the sampling may include determining the format of the analog video signal based on the number of sampled vertical lines and the number of horizontal samples.

The preset sampling frequency may be 74.25 MHz.

The determining of the format may farther include determining a burst frequency corresponding to the determined format.

The comb filter may be adaptively adjusted based on the burst frequency.

The reconfiguring of the digital video signal may include reconfiguring the digital video signal by merging the color difference signal and the luminance signal.

The merging may indicate alternately merging a sample of the color difference signal and a sample of the luminance signal.

The reconfiguring of the digital video signal may include reconfiguring the digital video signal as embedded data based on the color difference signal and the luminance signal.

According to another aspect, there is provided a video reception apparatus including a communicator configured to receive an analog video signal, and a processor configured to determine a format of the analog video signal, to convert the analog video signal to a digital video signal based on a sampling frequency corresponding to the determined format, to separate the digital video signal into a luminance signal and a color difference signal using an adaptive comb filter, and to reconfigure the digital video signal based on the luminance signal and the color difference signal.

The comb filter may be adaptively adjusted based on a burst frequency corresponding to the determined format.

The processor may be configured to sample the analog video signal at a preset sampling frequency, to determine the format of the analog video signal based on a result of the sampling, and to reset the sampling frequency corresponding to the determined format as a basic sampling frequency.

The processor may be configured to determine the format of the analog video signal based on the number of sampled vertical lines and the number of horizontal samples.

The processor may be configured to determine a burst frequency corresponding to the determined format.

The comb filter may be adaptively adjusted based on the burst frequency.

The processor may be configured to reconfigure the digital video signal by merging the color difference signal and the luminance signal.

The merging may indicate alternately merging, a sample of the color difference signal and a sample of the luminance signal.

The processor may be configured to reconfigure the digital video signal as embedded data based on the color difference signal and the luminance signal.

Effect

According to example embodiments, there may be provided an apparatus and method for receiving a multi-resolution analog video signal.

Also according to example embodiments, there may be provided an apparatus and method for converting an analog video signal to a digital video signal.

MODE

Figure 1:
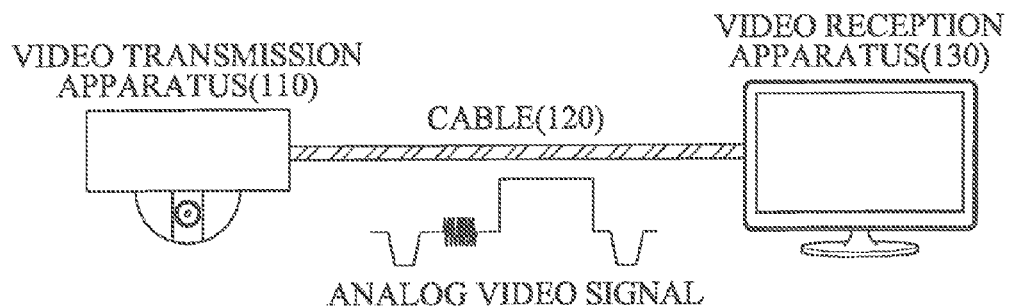
FIG. 1 illustrates an example of a closed-circuit system according to example embodiments.

Hereinafter, some example embodiments will be described in detail with reference to the accompanying drawings. Like reference numerals hi the drawings refer to like elements throughout the present specification.

Various, modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprise/include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates an example of a closed-circuit system according to example embodiments.

Referring to FIG. 1, the closed-circuit system may include a video transmission apparatus 110 and a video reception apparatus 130. The video transmission apparatus 110 and the video reception apparatus 130 may transmit and receive a signal using a cable 120. For example, the cable 120 may be a coaxial cable.

The video transmission apparatus 110 may generate a digital video signal using a camera for photographing a video. The video transmission apparatus 110 may convert the generated digital video signal to an analog video signal, and may transmit the converted analog video signal. In this manner, an existing system installed to transmit a standard definition may be used as is.

The video transmission apparatus 110 may adjust an analog video signal to be generated, based on a resolution of a photographed digital video. For example, the video transmission apparatus 110 may generate an analog video signal corresponding to a resolution of high definition (HD) or full HD (FHD).

The video reception apparatus 130 may receive the analog video signal from the video transmission apparatus 110. The video reception apparatus 130 may determine a format of the analog video signal from the received analog video signal. The video reception apparatus 130 may convert the analog video signal to the digital video signal based on the determined format.

A method of receiving, at the video reception apparatus 130, the analog video signal is described with reference to FIGS. 2 through 9.

Figure 2:
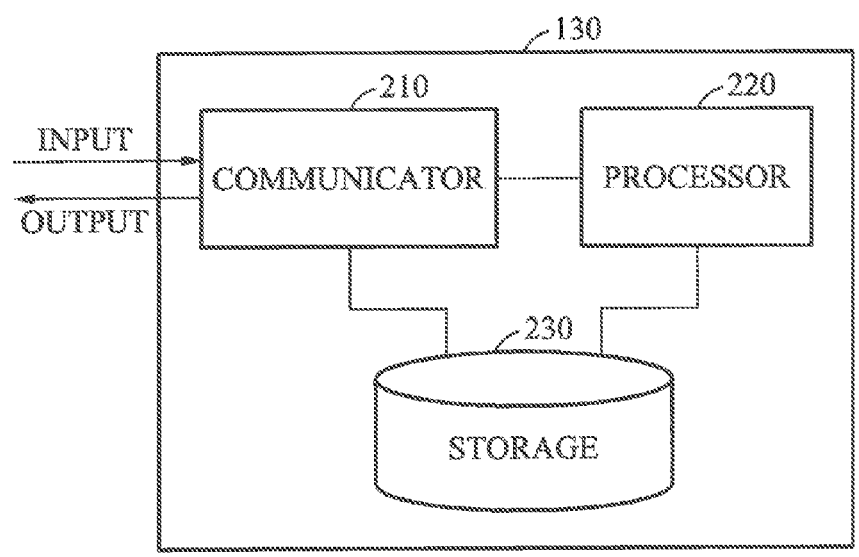
FIG. 2 is a block diagram illustrating an example of a video reception apparatus according to example embodiments.

FIG. 2 is a block diagram illustrating an example of a video reception apparatus according to example embodiments.

Referring to FIG. 2, the video reception apparatus 130 may include a communicator 210, a processor 220, and a storage 230.

The communicator 210 may be connected to another apparatus to transmit and receive data. For example, the communicator 210 may receive an analog video signal from the video transmission apparatus 110.

The processor 220 may process data received at the communicator 210, or may process data stored in the storage 230.

The storage 230 may receive data received at the communicator 210, or may store data processed at the processor 220.

The communicator 210, the processor 220, and the storage 230 are described with reference to FIGS. 3 through 9.

Figure 3:
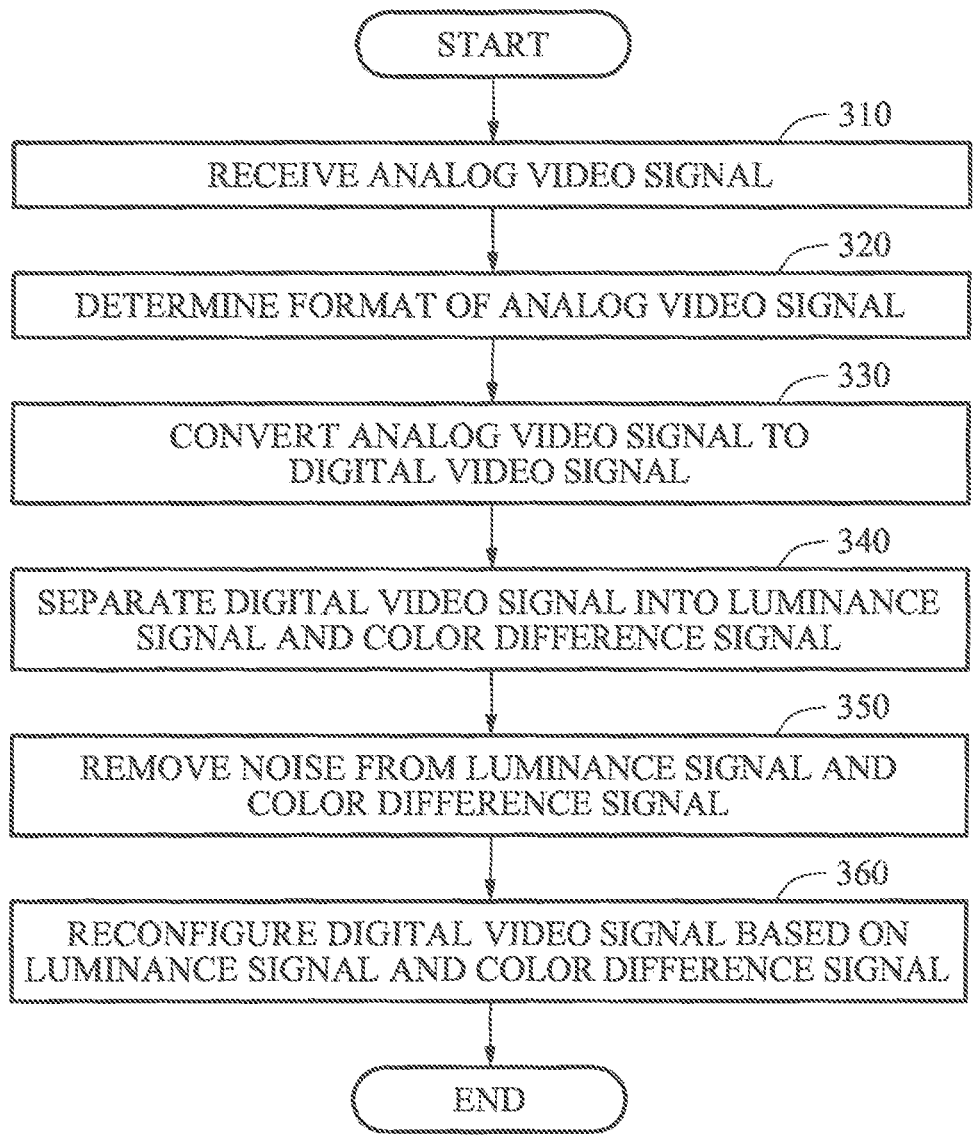
FIG. 3 is a flowchart illustrating a video reception method according to example embodiments.

FIG. 3 is a flowchart illustrating a video reception method according to example embodiments.

Referring to FIG. 3, in operation 310, the communicator 210 may receive an analog video signal from the video transmission apparatus 110.

According to an aspect, the communicator 210 may receive an analog video signal from the video transmission apparatus 110 through the cable 120.

The received analog video signal may be a signal that is adaptively converted based on a resolution of a digital video.

In operation 320, the processor 220 may determine a format of the analog video signal. The format of the analog video signal may indicate a resolution of a digital video signal applied to the analog video signal. A method of determining the format of the analog video signal is described with reference to FIG. 6.

In operation 330, the processor 220 may convert the analog video signal to the digital video signal.

According to an aspect, the processor 220 may convert the analog video signal to the digital video signal based on a sampling frequency corresponding to the determined format.

In operation 340, the processor 220 may separate the digital video signal into a luminance signal and a color difference signal. For example, the processor 220 may separate the digital video signal into a channel of the luminance signal and a channel of the color difference signal.

According to an aspect, the processor 220 may separate the digital video signal into the luminance signal and the color difference signal using an adaptive comb filter. A method of separating the digital video signal into the luminance signal and the color difference signal using a comb filter is described with reference to FIG. 7.

In operation 350, the processor 220 may remove noise from the luminance signal and the color difference signal. For example, the processor 220 may remove noise from at least one of the luminance signal and the color difference signal.

The processor 220 may remove noise from the luminance signal and the color difference signal using a low pass filter. A pass band of a lox pass filter used to remove noise of the luminance signal and a pass band of a low pass filter used to remove noise of the color difference signal may be set to differ from each other.

In operation 360, the processor 220 may reconfigure the digital video signal based on the luminance signal and the color difference signal. For example, the processor 220 may reconfigure the digital video signal by merging the color difference signal and the luminance signal.

A method of reconfiguring the digital video signal is described with reference to FIG. 8.

The video reception apparatus 130 may display the reconfigured digital video signal using a display.

Figure 4:
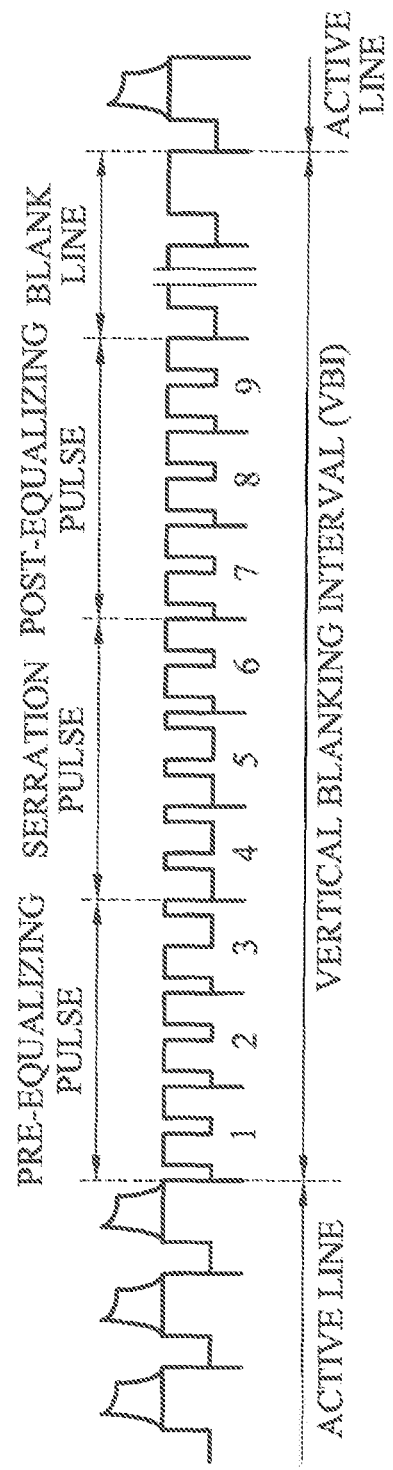
FIG. 4 illustrates an example of a vertical timing structure of an analog video signal according to example embodiments.

FIG. 4 illustrates an example of a vertical timing structure of an analog video signal according to example embodiments.

Referring to FIG. 4, an analog video signal received at the communicator 210 may include a pre-equalizing pulse, a serration pulse, a post-equalizing pulse, a blank line, and a plurality of active lines.

A vertical blanking interval (VBI) may include the pre-equalizing pulse, the serration pulse, the post-equalizing pulse, and the blank line.

For example, each of the pre-equalizing pulse, the serration pulse, and the post-equalizing pulse may include three lines. The VBI may include 20 or more lines.

A length of an active line may vary based on a resolution of a digital video. For example, the length of the active line may increase according to an increase in the resolution.

Table 1 shows the number of vertical timing lines, a frame rate, and a system frequency according to a total resolution.

TABLE 1

| Total resolution | Number of active lines | Number of blank lines | Frame rate (Hz) | System frequency (MHz) |
| --- | --- | --- | --- | --- |
| 858 × 525i | 480 | 45 | 29.97 | 13.5 |
| 864 × 625i | 576 | 49 | 25 | 13.5 |
| 1650 × 750p | 720 | 30 | 60 | 74.25 |
| 2200 × 1125p | 1080 | 45 | 30 | 74.25 |

Figure 5:
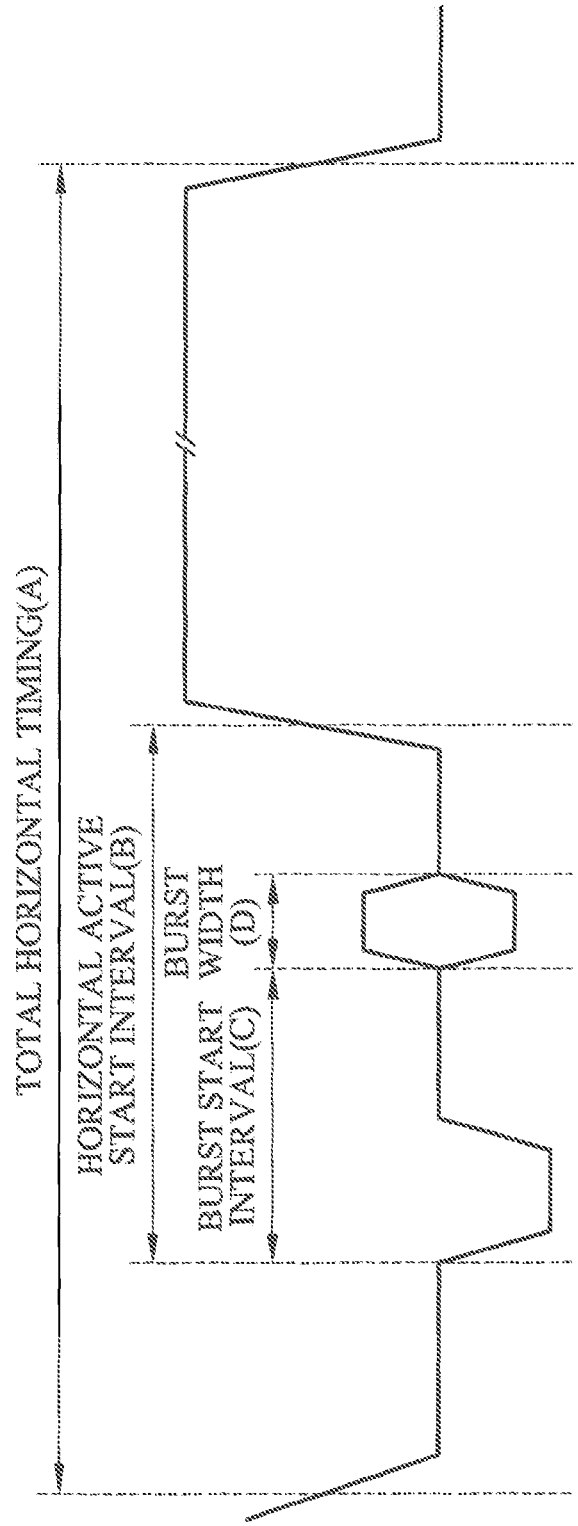
FIG. 5 illustrates an example of a horizontal timing structure of an analog video signal according to example embodiments.

FIG. 5 illustrates an example of a horizontal timing structure of an analog video signal according to example embodiments.

Referring to FIG. 5, a single line may be set as a total horizontal timing A. In the total horizontal timing A, a horizontal timing time of an analog video signal may be determined based on a resolution.

A horizontal active start interval B may be a section from a horizontal reference to a start point of an active area.

A burst start interval C may be a section from the horizontal reference to a start point of burst.

A burst width D may be a section from the start point of burst to an end point of burst.

Table 2 shows a horizontal timing structure of the analog video signal according to a resolution.

TABLE 2

| Resolution | A | B | C | D |
| --- | --- | --- | --- | --- |
| 720@25p | 53.33 us | 7.77 us | 4.17 us | 2.78 us |
| 720@30p | 44.44 us | 7.77 us | 4.17 us | 2.78 us |
| 720@50p | 26.665 us | 3.885 us | 2.085 us | 1.39 us |
| 720@60p | 22.22 us | 3.885 us | 2.085 us | 1.39 us |
| 1080@25p | 35.56 us | 3.501684 us | 2.289562 us | 0.942761 us |
| 1080@30p | 29.63 us | 3.501684 us | 2.289562 us | 0.942761 us |

Figure 6:
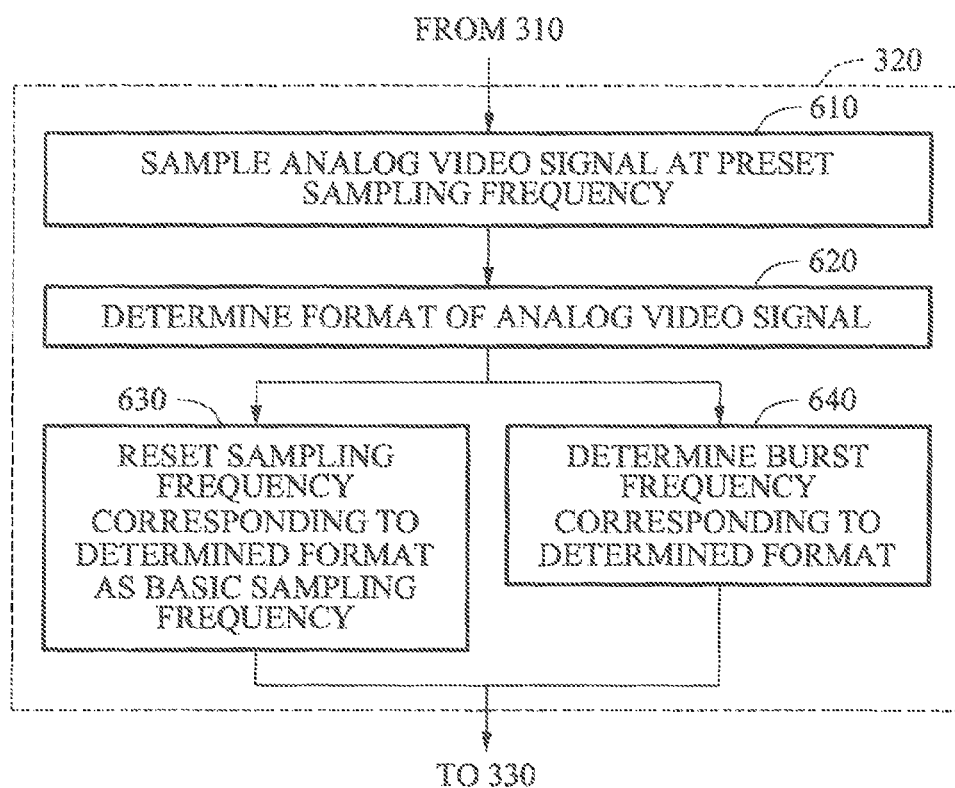
FIG. 6 is a flowchart illustrating a method of determining a format of an analog video signal according to example embodiments.

FIG. 6 is a flowchart illustrating a method of determining a format of an analog video signal according to example embodiments.

Operation 320 of FIG. 3 may include operations 610 through 640 of FIG. 6.

Referring to FIG. 6, in operation 610, the processor 220 may sample an analog video signal at a preset sampling frequency. For example, the preset sampling frequency may be 74.25 MHz.

In operation 620, the processor 220 may determine a format of the analog video signal based on a result of the sampling. For example, the format may be a resolution.

According to an aspect, the processor 220 may determine the format of the analog video signal based on the number of sampled vertical lines and the number of horizontal samples.

Table 3 shows a format of a signal according to the sampling result.

TABLE 3

| Resolution | Number of vertical lines | Horizontal interval (us) | Number of horizontal samples |
|---|---|---|---|
| 720 × 480i | 525 | 63.492 | 4704~4724 |
| 720 × 576i | 625 | 64 | 4742~4762 |
| 720 × 25p | 750 | 53.33 | 3950~3970 |
| 720 × 30p | 750 | 44.44 | 3290~3310 |
| 720 × 50p | 750 | 26.67 | 1970~1990 |
| 720 × 60p | 750 | 22.22 | 1640~1660 |
| 1080 × 25p | 1125 | 35.56 | 2630~2640 |
| 1080 × 30p | 1125 | 29.63 | 2190~2210 |

The horizontal interval may indicate the total horizontal timing A of FIG. 5.

In operation 630, the processor 220 may reset the sampling frequency corresponding to the determined format as a basic sampling frequency.

Table 4 shows the sampling frequency corresponding to the determined format.

TABLE 4

| Resolution | Frame rate | Basic sampling frequency | Subcarrier frequency |
|---|---|---|---|
| 720 × 480 | 60i | 27 MHz | 3.57 MHz |
| 720 × 480 | 50i | 27 MHz | 4.43 MHz |
| 720p/AHD (Analog High Definition) | 30p | 74.25 MHz | user definition |
| | 25p | 74.25 MHz | user definition |
| | 60p | 74.25 MHz | user definition |
| | 50p | 74.25 MHz | user definition |
| 1080p/AHD | 30p | 74.25 MHz | user definition |
| | 25p | 74.25 MHz | user definition |

In operation 330 of FIG. 3, the processor 220 may convert the received analog video signal to the digital video signal based on the reset sampling frequency.

In operation 640, the processor 220 may determine a burst frequency corresponding to the determined format. The burst frequency may be determined in advance in correspondence to the determined format.

The burst frequency may be used to adjust a comb filter.

The burst frequency may be a subcarrier frequency.

Figure 7:
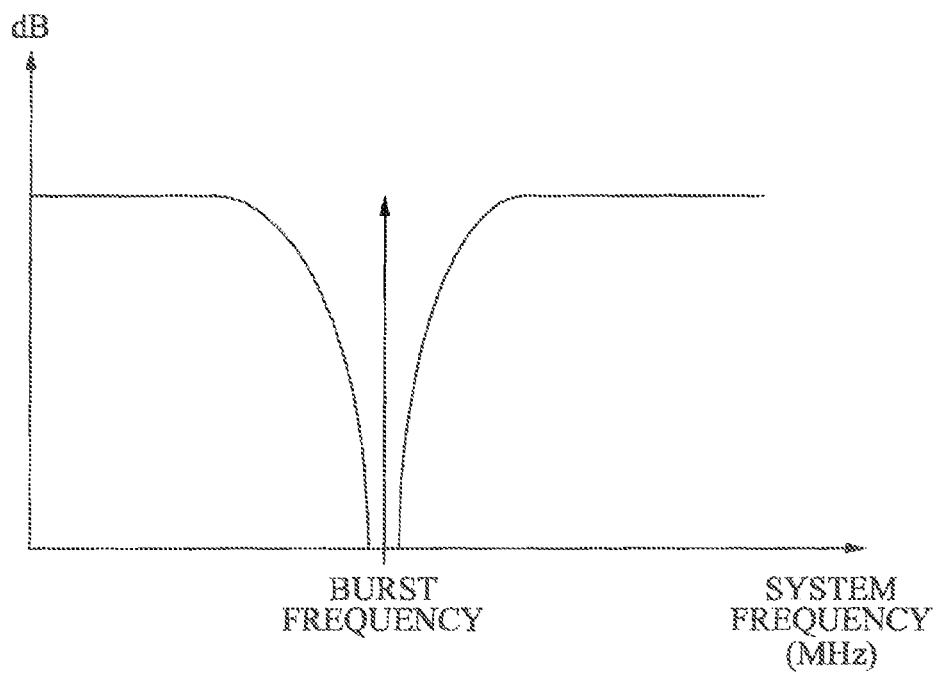
FIG. 7 is a graph showing an example of a frequency characteristic of a comb filter according to example embodiments.

FIG. 7 is a graph showing an example of a frequency characteristic of a comb filter according to example embodiments.

The frequency characteristic of the comb filter may be similar to a frequency characteristic of a band split filter.

A signal pass band of the comb filter may be divided based on a burst frequency.

When a format of an analog video signal is determined, the processor 220 may adaptively adjust the comb filter based on a burst frequency corresponding to the determined format.

The processor 220 may separate a digital video signal into a luminance signal and a color difference signal using the adjusted comb filter.

Figure 8:
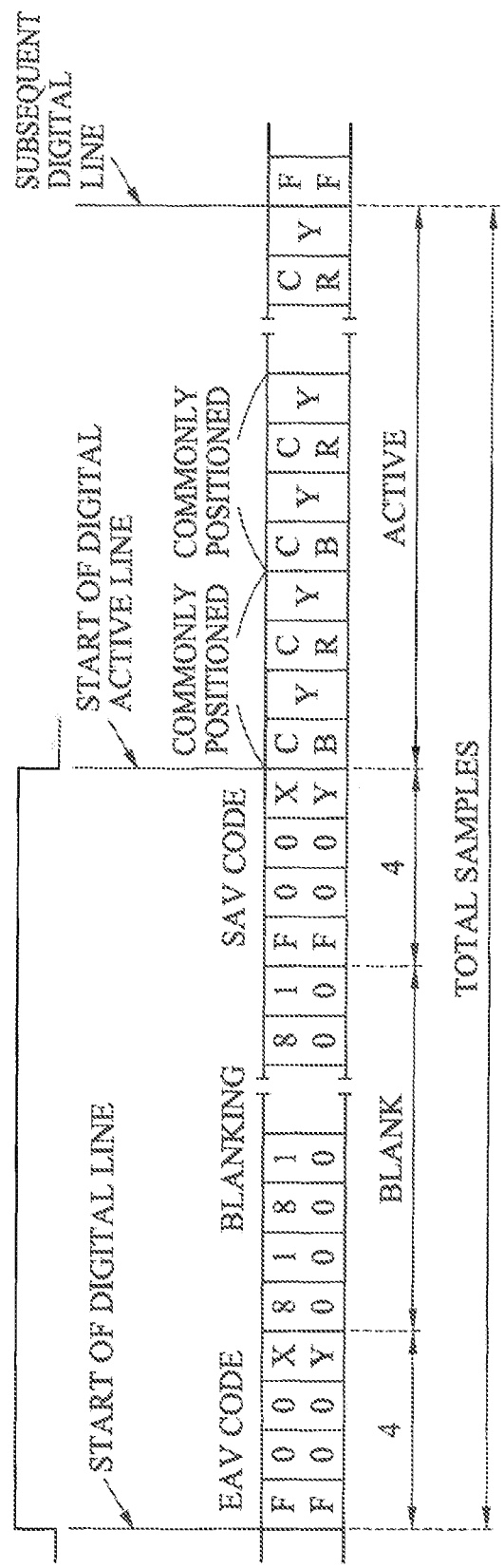
FIG. 8 illustrates an example of a timing structure of a reconfigured digital video signal according to example embodiments.

FIG. 8 illustrates an example of a timing structure of a reconfigured digital video signal according to example embodiments.

A single line of a reconfigured digital video signal may include an end of active video signal (EAV) code, blanking data, a start of active video signal (SAV) code, and active data.

An area that includes the EAV code, the blanking data, and the SAVE code may correspond to a portion that excludes an active area from a section of an analog video signal.

An area of the active data may correspond to the active area in the section of the analog video signal.

The processor 220 may reconfigure the digital video signal by merging a color difference signal and a luminance signal.

According to an aspect, the processor 220 may alternately merge a sample of the color difference signal and a sample of the luminance signal. For example, when YCSYCR is configured based on 4:2:2, the active area may be reconfigured in order of CB, Y, CR, and Y. Here, Y may be the sample of the luminance signal, and each of CB and CR may be the sample of the color difference signal.

According to another aspect, the processor 220 may reconfigure the digital video signal as embedded data based on the color difference signal and the luminance signal.

Figure 9:
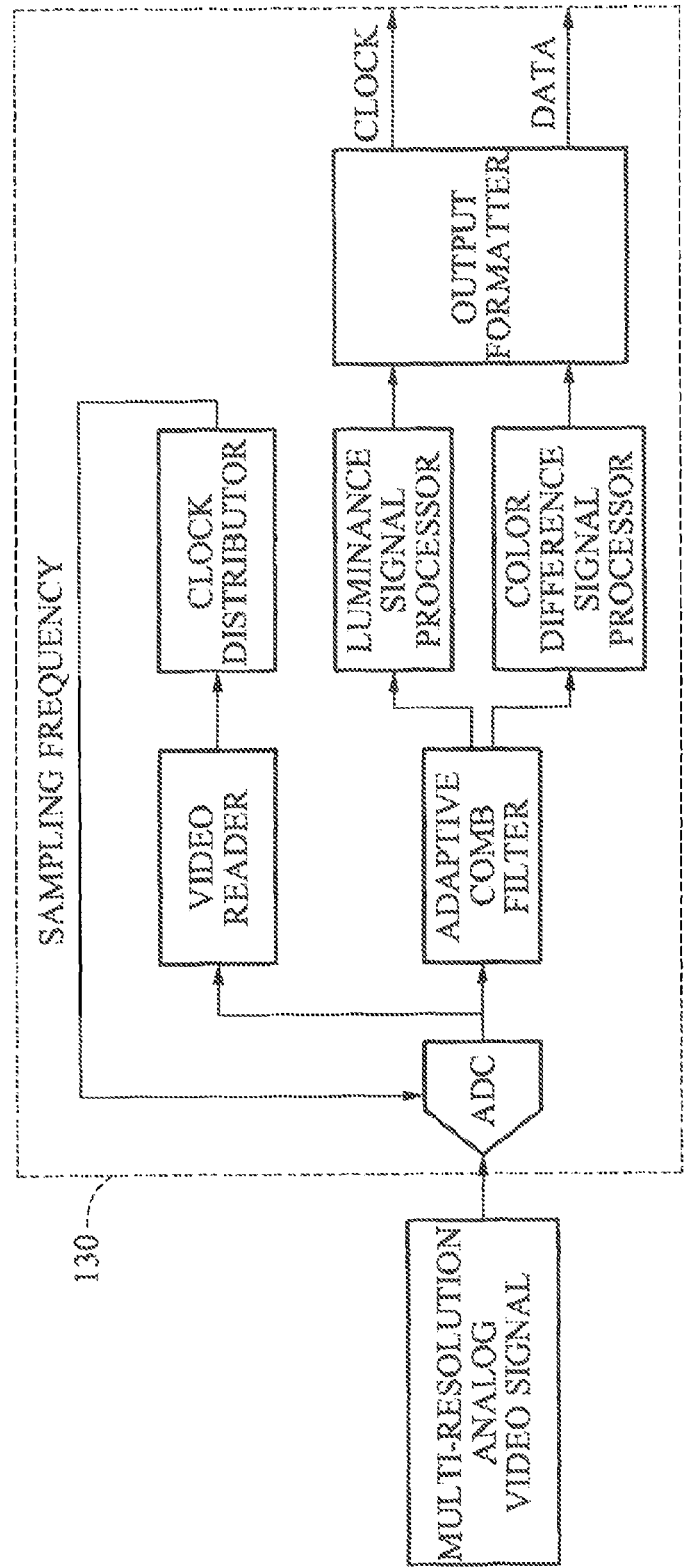
FIG. 9 is a block diagram illustrating another example of a video mention apparatus according to example embodiments.

FIG. 9 is a block diagram illustrating another example of a video reception apparatus according to example embodiments.

The processor 220 may include an analog to digital converter (ADC), a video reader, a clock distributor, an adaptive comb filter, a luminance signal processor, a color difference signal processor, and an output formatter.

The ADC may convert an analog video signal to a digital video signal based on a sampling frequency. The ADC may sample the analog video signal.

The video reader may set a sampling frequency appropriate for the analog video signal as a basic sampling frequency based on a result of the sampling. The video reader may determine a burst frequency and a format based on the basic sampling frequency.

The clock distributor may apply the set basic sampling frequency to the ADC.

The ADC may sample the analog video signal based on the applied basic sampling frequency.

The adaptive comb filter may adaptively adjust a frequency characteristic of the adaptive comb filter based on the format and the burst frequency. The adaptive comb filter may separate the digital video signal or a sampled value into a luminance signal and a color difference signal.

The luminance signal processor may remove noise of the luminance signal.

The color difference signal processor may remove noise of the color difference signal.

The output formatter may reconfigure the digital video signal based on the luminance signal and the color difference signal. The output formatter may output a clock and data of a digital video. For example, the digital data and the clock may be in an embedded type.

The units and/or modules described herein may be implemented using hardware components, software components, and/or combination of the hardware components and the software components. For example, the apparatuses and the hardware components described herein may be implemented using, for example, a processor, a controller and an arithmetic logic unit (ALU), a digital signal processor, a microcomputer, a field programmable array (FPA), a programmable logic unit (PLU), a microprocessor, or one or more general-purpose computers or specific-purpose computers such as any other device capable of responding to and executing instructions in a defined manner. The processing device may run an operating system (OS) and one or more software applications that run on the OS. The processing device also may access, store, manipulate, process, and create data in response to execution of the software. For purpose of simplicity the description of a processing device is used as singular; however; one skilled in the art will be appreciated that a processing device may include multiple processing elements and/or multiple types of processing elements. For example, a processing device may include multiple processors or a processor and a controller, in addition, different processing configurations are possible, such a parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical media and floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of receiving a video, the method comprising:
   receiving an analog video signal;
   adaptively determining a format of the analog video signal based on the analog video signal, wherein the determining of the format comprises:
      sampling the analog video signal at a preset sampling frequency;
      determining the format of the analog video signal based on the number of sampled vertical lines and the number of horizontal samples, the number of sampled vertical lines and the number of horizontal samples correspond to the format among a plurality of the formats; and
      resetting the sampling frequency corresponding to the determined format as s basic sampling frequency,
   converting the analog video signal to a digital video signal using the reset sampling frequency corresponding to the determined format;
   separating the digital video signal into a luminance signal and a color difference signal using an adaptive comb filter; and
   reconfiguring the digital video signal based on the luminance signal and the color difference signal.

2. The method of claim 1, wherein the comb filter is adaptively adjusted based on a burst frequency corresponding to the determined format.

3. The method of claim 1, further comprising
   removing noise from at least one of the luminance signal and the color difference signal.

4. The method of claim 3, wherein the removing of the noise comprises removing the noise using a low pass filter.

5. The method of claim 1, wherein the preset sampling frequency is 74.25 MHz.

6. The method of claim 1, wherein the determining of the format further comprises determining a burst frequency corresponding to the determined format, and
   the comb filter is adaptively adjusted based on the burst frequency.

7. The method of claim 1, wherein the reconfiguring of the digital video signal comprises reconfiguring the digital video signal by merging the color difference signal and the luminance signal.

8. The method of claim 7, wherein the merging indicates alternately merging a sample of the color difference signal and a sample of the luminance signal.

9. The method of claim 7, wherein the reconfiguring of the digital video signal comprises reconfiguring the digital video signal as embedded data based on the color difference signal and the luminance signal.

10. The method of claim 1, wherein the determining of the format comprises determining a burst frequency corresponding to the determined format, and
    the separating comprises adjusting the comb filter based on the burst frequency.

11. A video reception apparatus comprising:
    a communicator configured to receive an analog video signal; and
    a processor configured to adaptively determine a format of the analog video signal based on the analog video signal, to convert the analog video signal to a digital video signal using a sampling frequency corresponding to the determined format, to separate the digital video signal into a luminance signal and a color difference signal using an adaptive comb filter, and to reconfigure the digital video signal based on the luminance signal and the color difference signal,
    wherein the processor is configured to sample the analog video signal at a preset sampling frequency, to determine the format of the analog video signal based on the number of sampled vertical lines and the number of horizontal samples the number of sampled vertical lines and the number of horizontal samples correspond to the format among a plurality of the formats, and to reset the sampling frequency corresponding to the determined format as a basic sampling frequency.

12. The video reception apparatus of claim 11, wherein the comb filter is adaptively adjusted based on a burst frequency corresponding to the determined format.

13. The video reception apparatus of claim 11, wherein the processor is configured to determine a burst frequency corresponding to the determined format, and
    the comb filter is adaptively adjusted based on the burst frequency.

14. The video reception apparatus of claim 11, wherein the processor is configured to reconfigure the digital video signal by merging the color difference signal and the luminance signal.

15. The video reception apparatus of claim 14, wherein the merging indicates alternately merging a sample of the color difference signal and a sample of the luminance signal.

16. The video reception apparatus of claim 14, wherein the processor is configured to reconfigure the digital video signal as embedded data based on the color difference signal and the luminance signal.

17. The video reception apparatus of claim 11, wherein the processor is configured to determine a burst frequency corresponding to the determined format, and to adjust the comb filter based on the burst frequency.

* * * * *